Sept. 1, 1970          R. R. GROVER          3,526,410
ADJUSTABLE ARBOR CHUCK
Filed May 19, 1967          3 Sheets-Sheet 1
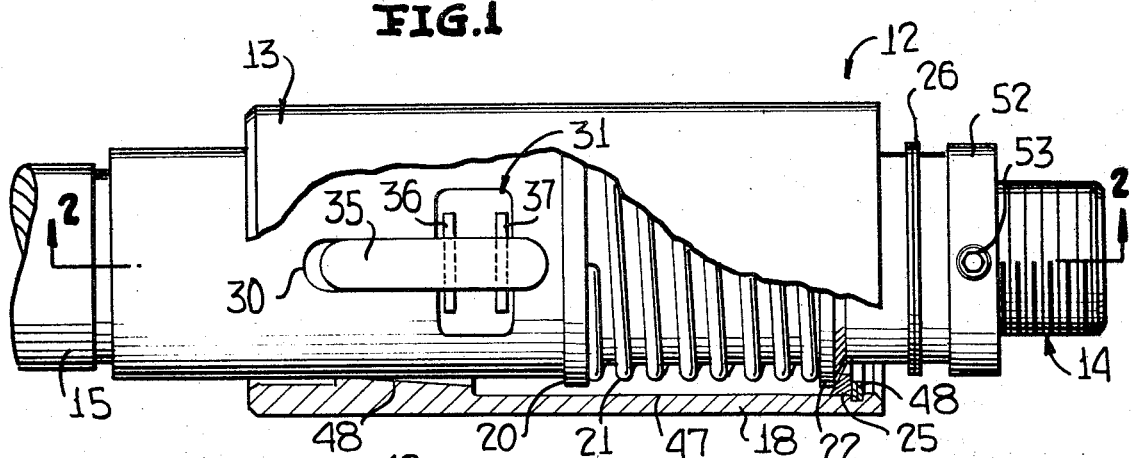
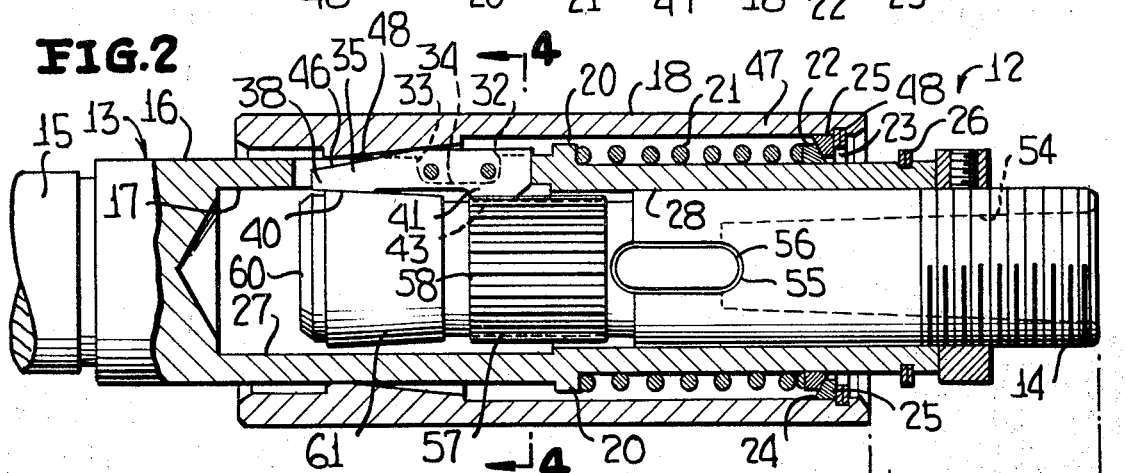
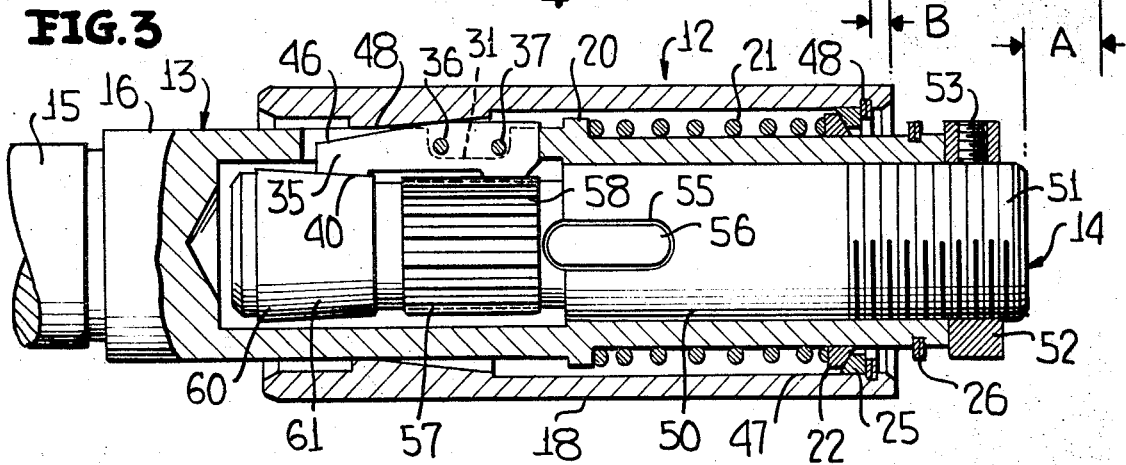
INVENTOR
ROBERT R. GROVER
BY Mason, Porter, Diller & Brown
ATTORNEYS

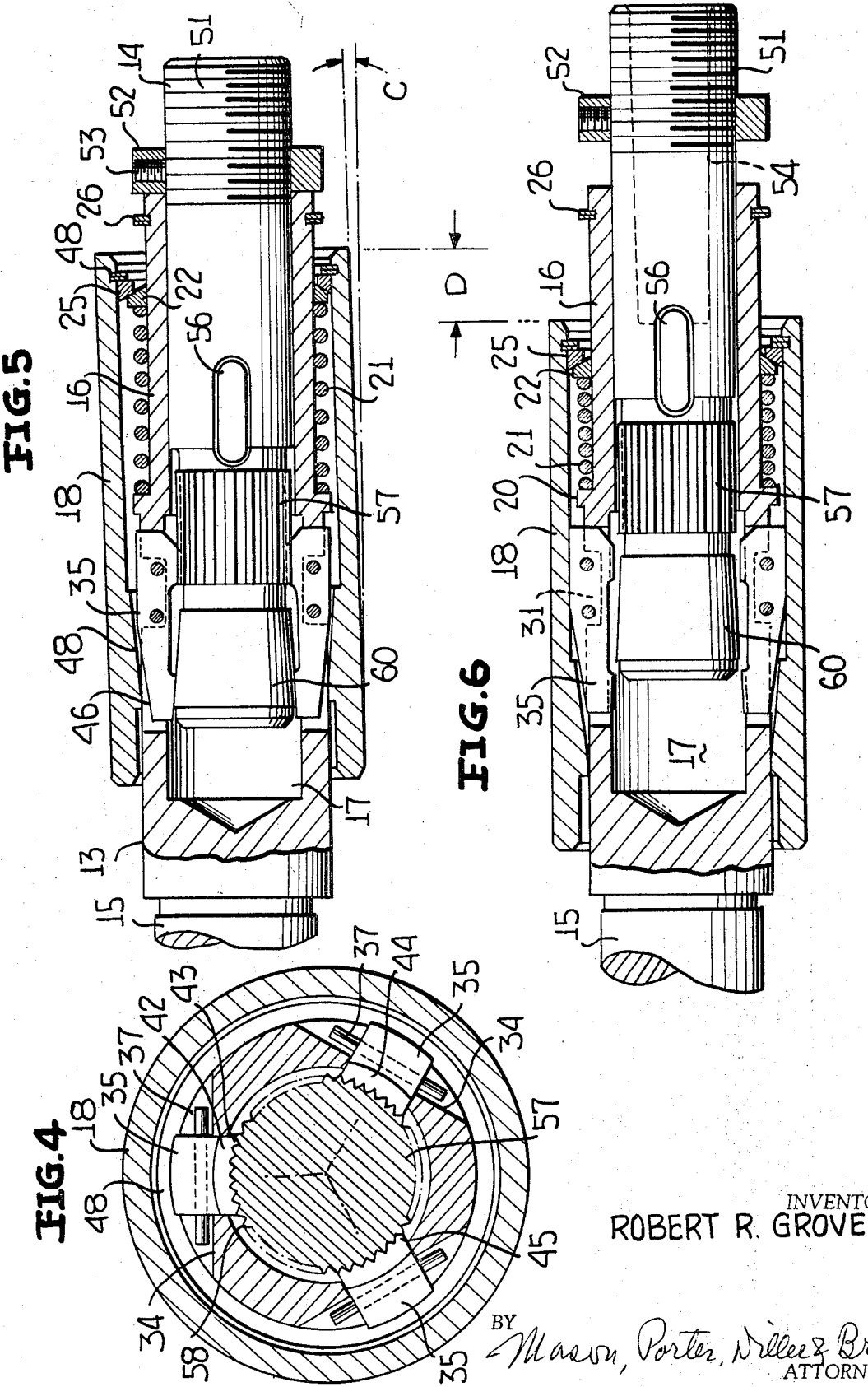

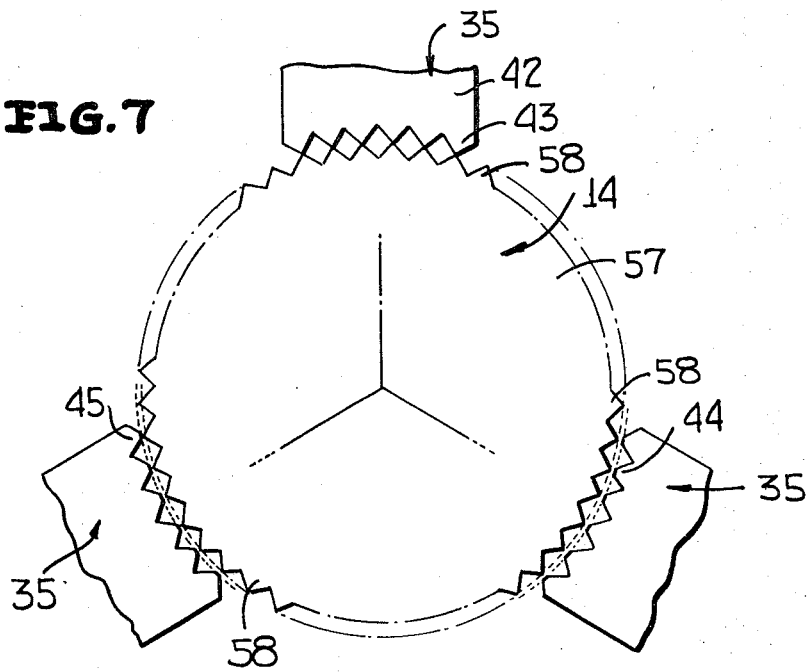
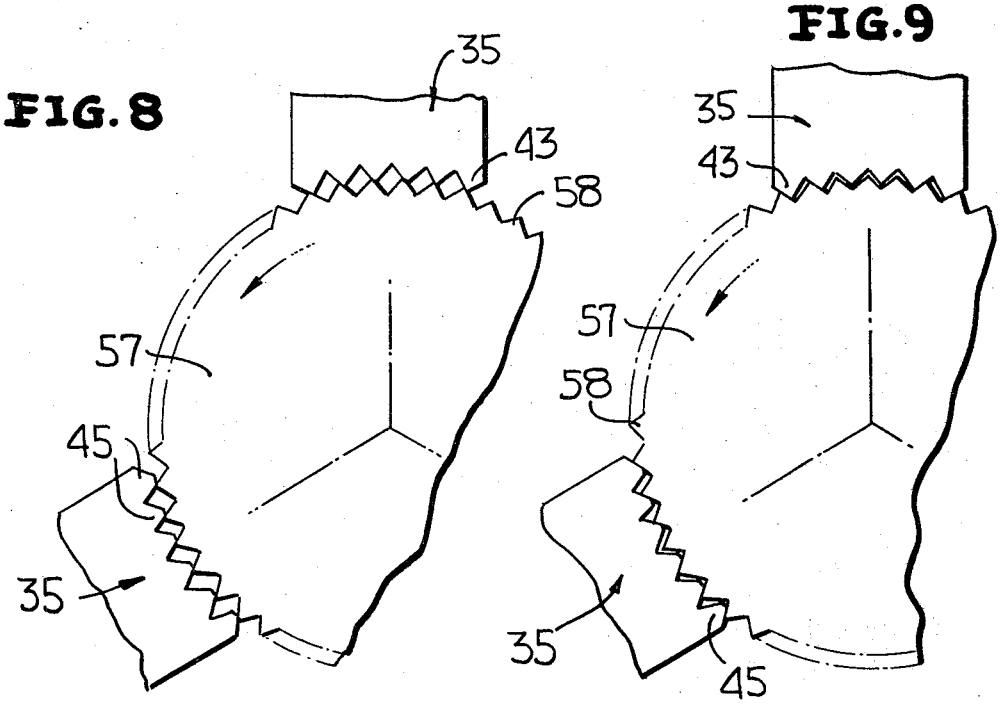

United States Patent Office 3,526,410
Patented Sept. 1, 1970

3,526,410
ADJUSTABLE ARBOR CHUCK
Robert R. Grover, Westport, N.H., assignor to Kingsbury Machine Tool Corporation, Keene, N.H., a corporation of Delaware
Filed May 19, 1967, Ser. No. 639,879
Int. Cl. B23b *31/12*
U.S. Cl. 279—57                    11 Claims

ABSTRACT OF THE DISCLOSURE

This disclosure relates to the combination of a chuck and an arbor adjustably positionable within a longitudinal socket of the chuck. The chuck is provided with three equidistantly circumferentially spaced locking members which are carried thereon in "floating" condition, each of the locking members having separate means for engaging corresponding arbor portions to lock the arbor within the chuck against both axial outward movement and rotational movement, relative to the chuck. A longitudinally movable spring-biased sleeve surrounds the chuck and has cam surfaces engageable with corresponding cam surfaces of the floating locking or clamp members. The arbor is also provided with a socket for receiving a tool and has a threaded nut member at its outer end for determining the depth of insertion of the arbor into the chuck. The arbor is provided with a tapered surface, corresponding tapered surface portions of the locking member being engageable with the arbor tapered surface to prevent axial outward movement of the arbor. The means which prevent relative rotation of the arbor comprises peripherally disposed teeth on the arbor engageable with corresponding teeth carried by the locking members. The teeth of two of the locking members are blunted, and the teeth of the other locking member is of full depth, whereby, upon radial inward movement of the locking members to engage the arbor, the teeth of the locking member which are of full depth will first engage between corresponding teeth on the arbor, thereby slightly rotating the arbor by camming action, whereby blunted apices of the other locking members are positioned for entry between full depth teeth on the arbor member.

---

This invention relates to connection means for machine tools, and more particularly to a novel arbor and a novel chuck, as well as their novel assembly, and its adaptation for machine tool centers.

When a machine tool with a machine tool center is employed for drilling, reaming, tapping and like operations, the machine tool center must have some form of tool holder or chuck mechanism for receiving the drilling, reaming, tapping, etc. tooling. Also, when a tool holder or chuck mechanism is employed to hold this machine tooling, problems of tool wear and replacement demand that the tooling be replaced in a minimum of time and conditions of economy demand that a minimum of energy be expended. Also, in the event that a chuck mechanism is used with the machine center it becomes an ultimate goal to have all the arbors used for identical operations adjustable, such that the tooling in the arbor can be pre-set prior to engagement with the chuck mechanism to allow the tooling to perform identical work operations. In devices of the prior art type, often an arbor and chuck are not readily removable, whereby a tool may be inserted into the arbor at a location remote from the operation thereof. Additionally, in devices of the prior art type, the arbor with the tool inserted therein are not adjustably positionable within the chuck and pre-set for a desired axial position of the tool. Even further, prior art devices often do not permit ready axial adjustment of a tool-carrying arbor within a chuck, from outside the chuck. Even further, prior art devices do not generally provide a positive lock of the chuck and arbor against relative rotation, either singly, or in combination with a means for locking the arbor against axial movement relative to the chuck.

The present invention seeks to obviate the above and other undesirable features of the prior art, in providing a novel chuck and arbor assembly having a positive lock against relative axial outward and rotational movement of the arbor within the chuck, whereby the arbor is adjustably positionable within the chuck socket and may be pre-set for a desired positioning therein.

Accordingly, it is a primary object of this invention to provide a novel arbor and chuck assembly, with the arbor received within a chuck socket, and having means carried by the chuck for locking an arbor received therein against axial and rotational movement relative thereto.

It is another object of this invention to accomplish the above object, wherein the locking function is accomplished by means of a "floating" locking member, or preferably a plurality of three equidistantly circumferentially spaced floating locking members disposed about the chuck socket.

It is a further object of this invention to provide an arbor and chuck assembly, whereby the arbor is provided with means for pre-setting the length of insertion of the arbor into the chuck socket.

It is yet another object of this invention to provide a novel arbor and chuck assembly, wherein the chuck includes three locking members, each having a tapered locking surface for engaging a corresponding tapered locking surface of the arbor, and each locking member also having toothed portions for engaging corresponding toothed portions on an arbor and whereby means are provided for assuring maximum engagement of locking member toothed portions with corresponding toothed portions on the arbor.

It is another object of this invention to accomplish the above object, whereby means are provided for clamping the locking members in their locking position, and whereby said latter means includes an axially movable spring-biased sleeve surrounding the chuck.

It is yet another object of this invention to provide a novel arbor and chuck assembly, whereby the arbor is readily connectable in clamped relation within the chuck, by the use of clamping members, the clamping members being retained in clamped position by an axially movable spring-biased sleeve, whereby a seating means is provided for one end of a spring associated with the sleeve, the seating means including mating conical surfaces disposed for concentric positioning and maximum engagement when the spring is in its condition of maximum free length, but whereby the sleeve is adapted to be "cocked" slightly angularly, in order to unseat the spring end, and release the sleeve from a locked position against arbor-clamping members.

It is another object of this invention to provide separate arbors and chucks, having the individual structural features adapted to accomplish the above objects, when used in the above and other numeral combinations.

With the above and other objects in view that will hereinafter appear, the nature of the invention will be more clearly understood by reference to the following detailed description, the appended claims and the several views illustrated in the accompanying drawings:

In the drawings:

FIG. 1 is a side elevational view of the adjustable arbor and chuck assembly of this invention, with a portion of the chuck sleeve broken away for clarity, in order to illustrate the "floating" nature of the locking members, and the axially urging spring with its novel seating arrangement.

FIG. 2 is a longitudinal sectional view of the adjustable arbor and chuck assembly of this invention, taken along the line 2—2 of FIG. 1, wherein the means for locking the arbor and chuck against relative axial and rotational movement is clearly illustrated, with the arbor being shown in its maximum extended locked or clamped position.

FIG. 3 is a view similar to FIG. 2, but wherein the arbor is illustrated in its minimum extended locked or clamped position.

FIG. 4 is an enlarged sectional view taken along the line 4—4 of FIG. 2, and wherein the three circumferentially spaced floating locking members are illustrated in toothed engagement with toothed portions of the arbor.

FIG. 5 is a longitudinal sectional view generally similar to that of FIG. 2, but wherein the axially movable sleeve is illustrated in a "cocked," or unseated position, whereby engagement is broken between inner camming portions on the sleeve and outer camming portions on the "floating" locking members.

FIG. 6 is a longitudinal sectional view of the adjustable arbor and chuck assembly of this invention, taken generally along the line 2—2 of FIG. 1, but wherein the axially movable sleeve is illustrated in its fully retracted position, with its biasing spring compressed, whereby all clamping forces are removed from the "floating" clamping members, and the arbor is free to be axially outwardly removed, as for example, in the position illustrated.

FIG. 7 is an enlarged fragmentary end view of portions of the three equidistantly circumferentially spaced locking members, and the corresponding anti-rotational locking portion of the arbor, in an initial position of engagement of toothed portions of the locking members with corresponding toothed portions on the arbor, whereby full depth toothed portions of the uppermost locking member are shown with their apices contacting adjacent corresponding apices of arbor teeth, and wherein teeth of the two lowermost locking members are illustrated as being blunted, or having their apices removed.

FIG. 8 is a view similar to that of FIG. 7, but wherein the teeth of the uppermost locking member are illustrated in a position more inwardly disposed than in FIG. 7, whereby toothed surfaces are in engagement with corresponding toothed surfaces on the arbor member, having slightly rotated the arbor member in a counter-clockwise direction, whereby toothed surfaces of a lower locking member having blunted teeth are illustrated in a position of initial engagement against toothed surfaces of adjacent arbor toothed portions.

FIG. 9 is a view generally similar to FIG. 8, but wherein both upper and lower locking members are illustrated with their teeth in positions tending toward maximum engagement between corresponding teeth on the arbor.

Referring now to the drawings in detail, reference is first made to FIG. 1, wherein there is illustrated an arbor and chuck assembly, generally designated by the numeral 12, comprising a chuck 13 and an arbor 14.

The chuck 13 includes a generally rotatably driven portion 15, a generally cylindrical portion 16 having a blind hole or socket or bore 17 therein, and an axially slidable sleeve 18 disposed about the generally cylindrical portion 16.

The chuck cylindrical portion 16 is provided with a flange-like portion 20 providing an abutment for one end of an axially compressible helical spring 21 disposed about the right end of the cylindrical portion 16, as viewed in FIG. 2. The other end of the spring 21 is in abutment against a washer 22 disposed about the cylindrical portion 16, in close sliding-fit relation relative thereto. The washer 22 has a conically tapered face 23, at the right end thereof, in mating engagement with a complementary conically tapered surface 24 of a similar washer 25 carried by the sleeve 18. A stop ring 26 is provided, carried in an annular groove about the periphery of the cylindrical portion 16, at its rightmost end thereof. The top ring 26 is adapted to limit maximum rightward movement of the sleeve 18, in providing a means to engage end portions carried by the sleeve 18, if necessary.

The socket 17 has an enlarged or undercut innermost portion 27, and a bored portion 28, adapted to engage a corresponding portion of the arbor 14 in close sliding-fit relation therewith, in a manner later to be described.

The cylindrical portion 16 of the chuck 13 is provided with three equidistantly circumferentially disposed axially elongated slotted holes (or slots) 30, extending through the wall of the cylindrical portion 16 to the undercut portion 27 of the socket 17 thereof. Each slot 30 is provided with a groove 31, traversing the slot 30 near the right-most end thereof as viewed in FIG. 1, each groove 31 being formed by milling or the like across the outer surface of the cylindrical portion 16 of the chuck 13, with the milled groove 31 having end wall portions 32 and 33 and a bottom wall 34, the groove 31 extending incompletely through the wall of the cylindrical portion 16.

A locking or clamping member 35 is disposed within each slot 30, and is slidable therein for limited radial and longitudinal movement, in generally "floating" relation, each locking member 35 being generally unsecured to any other element in fixed relation.

Each locking member 35 is provided with two guide pins 36 and 37, with each of the pins being press-fitted within transverse holes through the locking member 35, to be securely carried by the locking member 35, and have lateral extensions on each side thereof. The lateral extensions of the pins 36 and 37 are normally positioned close to adjacent groove wall surfaces 33 and 32, respectively, but are sufficiently spaced therefrom an amount to permit limited longitudinal movement of the locking members 35 within the slots 30, prior to abutting engagement of lateral extensions of the pins 36 and 37 with their corresponding groove wall surfaces 33 and 32.

Each of the locking members 35 is provided with an axial clamping portion 38 having a tapered clamping surface 40 inwardly thereof, with each of the tapered clamping surfaces 40 intersecting the longitudinal central axis of the assembly 12 toward the right of the clamping surfaces 40, as viewed in FIG. 2, whereby an included angle between clamping surfaces 40 is within the range of 4° to 6°. Each clamping surface 40 is adapted to engage a corresponding clamping surface of the arbor 14, in a manner later to be described.

Each clamping member 35 includes a rotational clamping portion 41, terminating radially inwardly in clamping teeth 42, also adapted to engage corresponding clamping teeth of the arbor 14, in a manner later to be described. The clamping teeth 42 are either of the full depth type such as those 43 illustrated at the top of FIG. 4, or have blunted apices, such as those 44 and 45, illustrated at the bottom of FIG. 4. Those teeth 44 and 45 having blunted apices may be so formed by milling or otherwise cutting away approximately 0.010 inch from their outermost apices, for a purpose also later to be described.

Each of the locking members 35 is also provided with a tapered camming surface 46, on its outermost surface thereof, each tapered surface 46 extending along a plane adapted to intersect the longitudinal central axis of the assembly 12 at the left end thereof as viewed in FIG. 2, defining an included angle between tapered surface portions of approximately 8° to 10°.

The sleeve 18 is provided with an inner bore 47 and an inner generally conically tapered camming surface 48, the plane of the conical tapered surface 48, if extended, defining with the longitudinal central axis of the assembly 12 an included angle within the range of 6° to 8°. The conical tapered surface 48 is thus adapted to engage the camming surfaces 46 of the locking members 35, and to urge the same inwardly against the arbor 14, during rightward longitudinal movement of the sleeve 18. The bore 47 of the sleeve 18 is provided with an annular groove in which is received a stop ring 48. The washer 25 is carried by the sleeve 18, and is engaged against the stop ring 48. The spring 21 is thus housed within the bore 47 of the sleeve 18, and outwardly of the surface of the cylindrical portion 16 of the chuck 13.

The arbor 14 includes a generally cylindrical portion 50 slidably receivable in close-fit relation within the bore 28 of the cylindrical portion 16 of the chuck 13. The cylindrical portion 50 has external threads 51 at its rightmost end, upon which is threaded an adjustment nut 52 for limiting the depth of penetration of the arbor 14 into the socket 17 of the chuck 13. The adjustment nut 52 is provided with an Allen set screw 53 or other similar locking means. The cylindrical portion 50 of the arbor 14 is provided with a conically tapered socket 54 for receiving therein the shank of a tool (not shown). The cylindrical portion 50 of the arbor 14 is provided with an elongated slotted hole 55 extending therethrough, in which is received a tang 56, for providing a tang-end drive for a tool disposed within the tapered socket 54 of the arbor 14, and also to facilitate removal of a tool from the socket 54.

The arbor 14 is provided with a rotational lock or clamp portion 57, comprising longitudinally extending teeth 58 circumferentially disposed about the periphery thereof. The teeth 58 are adapted to engage the teeth 43, 44 and 45 of the locking members 35, at an infinite number of positions along the teeth 58. An axial movement locking portion 60 is provided at the left-most end of the arbor 14, comprising a generally conically tapered surface 61 which, if extended, would have an apex intersecting the longitudinal central axis of the assembly 12 at the right end thereof, as viewed in FIG. 3, and to define an included angle also of 4° to 6°, generally parallel with the surfaces 40 of the locking members 35. The portions 57 and 60 are of a lesser outer diametrical dimension than the arbor portion 50, in order to permit the passage of portions 57 and 60 through the bore 28 of the cylindrical portion 16 of the chuck 13.

Each of the locking or clamping members 35 is maintained in a "floating" condition by guiding means comprising the sides of the slot 30, the tapered camming surface 48 of the sleeve 18, and the pins 36 and 37 in engagement with walls 32, 33 and 34 of the groove 31. This feature permits both the axial clamping portion 38 and the anti-rotational clamping portion 41 of each member 35 to firmly engage their respective arbor clamping portions 60 and 57, a feature which would not be readily possible if the connection between each of the locking members 35 and the chuck cylindrical portion 16 was, for example, a purely pivotal connection.

Additionally, when the arbor 14 is clamped in position, the three clamping surfaces 40 of the member 35 are maintained in position against the surface 61 of the portion 60 of the arbor 14, and are prevented from moving radially outwardly by the camming surface portion 48 of the sleeve 18, which is in the extreme rightward position thereof that is permitted by a longitudinal position of the arbor 14 within the chuck 13. Thus, for any given position of the arbor 14 within the chuck 13, the arbor is securely locked against longitudinal outward movement, by a wedging of the axial clamping portion 60 of the arbor 14 between the clamping members 35. The sleeve 18 functions to lock the clamping members in their clamped position.

With reference to FIGS. 2 and 3, it is clearly seen that the maximum axial adjustment of the arbor 14 within the chuck 13, controlled by positioning of the adjustment 53 on the threaded end 51 of the cylindrical portion 50 of the arbor 14 is designated by the letter "A," the arbor 14 being adapted for infinite adjustment between the two positions illustrated in FIGS. 2 and 3. In the position of maximum insertion of the arbor 14 into the chuck 13, illustrated in FIG. 3, it is to be noted that the members 35 engage the tapered portion 60 at its right end, or at its end having the smaller diameter. Consequently, the clamping members 35 are disposed slightly more radially inwardly than in their position of FIG. 2, and the camming surface 48 of the sleeve 18 thus engages the members 35 at a different longitudinal position along the tapered surface 48, resulting in a range of positions for the sleeve 18 designated by the letter "B" in FIGS. 2 and 3.

The mating conical surfaces 23 and 24 of the washers 22 and 25 provide a means for assuring concentric positioning of the cylindrical portion 16 of the chuck 13, and consequently of the arbor 14 engaged within the bore 28 of the cylindrical portion 16, in each clamped position of the assembly 12. It is also to be noted that the included angle at the intersection of the extended plane of camming surface 48 with the longitudinal central axis of the assembly 12 is less than the included angle between extended planes of the upper camming surfaces 46 of the members 35, at their junction with the longitudinal axis of the assembly 12. This feature, in combination with the positive seating arrangement provided by the washers 22 and 25, permit a means of readily unlocking the sleeve 18 from the clamping members 35, to permit removal of the arbor 14 from the socket 17 of the chuck 13. This is accomplished by "cocking" the sleeve 18 through an angular distance designated by the letter "C" an amount approximately equal to 1°, temporarily unseating the washers 22 and 25 an amount sufficient to break any frictional engagement between the sleeve tapered camming surface 48 and clamping member camming surfaces 46. Reference is made to FIG. 5 in this regard. The sleeve 18 may then be moved leftward as viewed in FIGS. 5 and 6, after reseating of the washers 22 and 25, the leftward movement being an amount approximately equal to that indicated by the letter "D," whereby the spring 21 is compressed and the sleeve tapered camming surface 48 is moved sufficiently free of the clamping members 35 to facilitate their radial outward movement upon axial outward movement of the arbor 14, as shown in FIG. 6.

Referring now to FIGS. 7 through 9, there is illustrated a progression of positions of clamp members 35 in their radial inward movement to engage the anti-rotational clamp portion 57 of the arbor 14. Upon positioning the arbor 14 within the socket 17 of the chuck 13, it is possible that the teeth 58 will be so positioned that the teeth 43, 44 and 45 of the clamping member 35 may move radially inwardly to engage between adjacent teeth 58, without requiring any rotational movement of the arbor 14. On the other hand, it is possible that the arbor 14 may be so positioned within the socket 17 of the chuck 13 that the teeth 58 thereof may be in any number of positions with respect to the teeth 43, 44 and 45 of the members 35, to a maximum disadvantageous position such as that illustrated in FIG. 7, wherein the teeth 43 and 58, of the same diametral pitch, are disposed peak-to-peak, or apex-to-apex. Thus, it is possible, that if all of the teeth on the members 35 were of full height, some teeth could engage slightly on one side of the teeth 58 of the portion 57, and the teeth of another member 35 could engage slightly on the other side of teeth 58 of the portion 57, thereby resulting in an equilibrium position of the arbor 14, whereby it would not be rotated an amount sufficient to permit the teeth 43, 44 and 45 to engage between teeth 58.

The device of this invention overcomes the above difficulty by providing blunted apieces for the teeth 44 and 45, but wherein the teeth 43 are of full height, terminating in points. This permits the teeth 43 to engage the teeth 58 of the radially stationary arbor 14, and in meeting the teeth 58 apex-to-apex, the teeth 43 will always engage the teeth 58 to one side or the other, there being no "play" or tolerance between various ones of the teeth 43 as there would be between the teeth 43 and the teeth 45, for example. Thus, as the upper clamping member 35 moves radially inwardly to facilitate contacting of the teeth 58 by the teeth 43, the tooth portion 57 and consequently the entire arbor 14 are pivoted in a counter-clockwise direction an amount sufficient for the teeth 44 and 45 of the lower clamping members 35 to engage on a similar side of the teeth 58, and to continue sliding along the corresponding teeth 58 through the positions illustrated in FIGS. 8 and 9, to the position illustrated in FIG. 4, wherein the teeth 43, 44 and 45 are in positions of maximum engagement with the teeth 58 carried by the toothed portion 57 of the arbor 14. Thus, there is provided a novel clamping arrangement which will always assure maximum engagement of teeth of the clamping members 35 with the teeth of the arbor 14.

From the foregoing, it will be seen that novel and advantageous provisions have been made for carrying out the desired end. However, attention is again directed to the fact that additional variations may be made in this invention without departing from the spirit and scope thereof as defined in the appended claims.

I claim:

1. An arbor and chuck assembly comprising an arbor and a chuck, said arbor being of generally cylindrical configuration, said chuck including a generally cylindrical portion and having a longitudinally disposed bore opening extending inwardly from one end, said arbor being disposed within said bore, said chuck including a sleeve disposed for axial movement along said cylindrical portion, a plurality of elongated locking members floatingly mounted on said chuck cylindrical portion, each said locking member including an outer cam portion, said sleeve including inner cam means, spring means for urging said sleeve axially of said cylindrical portion whereby said cam means engage said cam portions for radial inward movement of said locking members and clamp said locking members against said arbor, said arbor including an axial lock portion and a rotational lock portion, each said locking member including an axial lock portion and a rotational lock portion, said axial lock poritons having generally mating surfaces which taper toward an apex in the direction of said bore opening, in their locked condition, and orienting means responsive to said radial inward movement of said locking members for rotating said arbor relative to said chuck.

2. The assembly of claim 1 wherein the included angle of said taper at said apex is approximately within the range of 4° to 6°.

3. An arbor and chuck assembly comprising an arbor and a chuck, said arbor being of generally cylindrical configuration, said chuck including a generally cylindrical portion and having a longitudinally disposed socket extending inwardly from one end, said arbor being disposed within said socket, said chuck including a sleeve disposed for axial movement along said cylindrical portion, a plurality of locking members carried by said chuck cylindrical portion, each said locking member including an outer cam portion, said sleeve including inner cam means, spring means for urging said sleeve axially of said cylindrical portion whereby said cam means engage said cam portions for radial inward movement and clamp said locking members against said arbor, said arbor including an axial lock portion and a rotational lock portion, and each said locking member including an axial lock portion and a rotational lock portion, said rotational lock portions comprising generally mating longitudinally extending teeth disposed around the periphery of said arbor rotational lock portion and on an inner surface of each said chuck rotational lock portion.

4. The assembly of claim 3 wherein said rotational lock portions are provided on said chuck at three equidistantly circumferentially spaced positions around the rotational lock portion of said arbor.

5. The assembly of claim 4 wherein the teeth on two of said chuck rotational lock portions have their radial innermost apices blunted or removed.

6. An arbor and chuck assembly comprising an arbor and a chuck, said arbor being of generally cylindrical configuration, said chuck including a generally cylindrical portion and having a longitudinally disposed socket extending inwardly from one end, said arbor being disposed within said socket, said chuck including a sleeve disposed for axial movement along said cylindrical portion, a plurality of elongated locking members floatingly mounted on said chuck cylindrical portion, each said locking member including an outer cam portion, said sleeve including inner cam means, spring means for urging said sleeve axially of said cylindrical portion whereby said cam means engage said cam portions for radial inward movement of said locking members and clamp said locking members against said arbor, said spring means comprising a helical spring disposed about said cylindrical portion and having one end of said spring engaged thereagainst, means being provided at said other spring end for transmitting spring force to said sleeve and for facilitating slight angular displacement of said sleeve relative to said assembly axis to release said cam means from said cam portion, and orienting means responsive to said radial inward movement of said locking members for rotating said arbor relative to said chuck.

7. An arbor and chuck assembly comprising an arbor and a chuck, said arbor being of generally cylindrical configuration, said chuck including a generally cylindrical portion and having a longitudinally disposed socket extending inwardly from one end, said arbor being disposed within said socket, said chuck including a sleeve disposed for axial movement along said cylindrical portion, a plurality of locking members carried by said chuck cylindrical portion, each said locking member including an outer cam portion, said sleeve including inner cam means, spring means for urging said sleeve axially of said cylindrical portion whereby said cam means engage said cam portions for radial inward movement and clamp said locking members against said arbor, said spring means comprising a helical spring disposed about said cylindrical portion and having one end of said spring engaged thereagainst, means being provided at said other spring end for transmitting spring force to said sleeve and for facilitating slight angular displacement of said sleeve relative to said assembly axis to release said cam means from said cam portions, said latter means comprising two ring-like elements having complementary conical faces, one said element being carried by an adjacent end of said sleeve, the other element being closely slidably disposed on said cylindrical portion.

8. The assembly of claim 7 wherein each said element is of a radial thickness less than the difference between the outer diameter of the adjacent cylindrical portion and the inner diameter of the adjacent sleeve.

9. A clamping device comprising three equidistantly circumferentially spaced clamping members disposed for simultaneously radial movement relative to a radially stationary member, said radially stationary member having identical full depth teeth disposed entirely around a periphery thereof; each clamping member having corresponding teeth of the same pitch disposed about their adjacent peripheries; each said clamping member being disposed for radial movement whereby each clamping member tooth is adapted to engage between a pair of adjacent teeth on said radially stationary member; and means whereby teeth of one clamping member first engage between teeth of said radially stationary member and rotate said radially stationary member to receive teeth of said other clamping members.

10. The device of claim 9 whrein said means comprises the teeth of one of said clamping members being of full height, and the teeth of the remaining two clamping members having their outermost apices removed.

11. A clamping device comprising an arbor and a chuck, said chuck having a longitudinally extending bore formed therein, first clamping means on said chuck cooperatively engaging first clamping means on said arbor for holding said arbor within said bore, and orienting means for automatically rotating said arbor within said bore for properly orienting said arbor therein, said orienting means being comprised of locking member means on said chuck and clamp portion means on said arbor, said locking member means and said clamp portion means each including teeth means extending longitudinally of said bore, said locking member means being comprised of a plurality of lock portions, at least one of said lock portions having teeth thereon tapering to an apex and others of said lock potrions having blunted teeth thereon.

References Cited

UNITED STATES PATENTS

| | | | |
|---|---|---|---|
| 1,120,530 | 12/1914 | Pieper | 279—57 |
| 1,589,355 | 6/1926 | Bridwell | 279—65 |
| 1,862,337 | 6/1932 | Emrick | 279—74 X |
| 2,709,600 | 5/1955 | Lehde | 279—59 X |
| 2,822,177 | 2/1958 | Tripp | 279—58 |
| 2,926,020 | 2/1960 | Dayton | 279—22 X |
| 2,543,117 | 2/1951 | Mackmann | 279—123 X |
| 2,018,088 | 10/1935 | Poock. | |
| 2,445,184 | 7/1948 | Parker. | |
| 2,552,732 | 5/1951 | Plante. | |

LESTER M. SWINGLE, Primary Examiner

J. C. PETERS, Assistant Examiner

U.S. Cl. X.R.

279—16